United States Patent [19]

Moen et al.

[11] 3,778,211

[45] Dec. 11, 1973

[54] PLASTIC INJECTION MOLD APPARATUS

[75] Inventors: Raymond S. Moen, Melrose Park; Edward T. Sanelli, Buffalo Grove, both of Ill.

[73] Assignee: Redmer Plastics, Inc., Franklin Park, Ill.

[22] Filed: Dec. 27, 1971

[21] Appl. No.: 211,932

[52] U.S. Cl. ............................................. 425/245
[51] Int. Cl. ............................................. B28b 1/24
[58] Field of Search ................... 425/242, 249, 129, 425/146, 159, 163, 170, 192, 236, 245, 247, 249, 468, 326, 437, 78, 443, 438, 355, 352, 422, 405, 414, 415, 416; 164/301, 302, 303, 306, 304, 397

[56] References Cited
UNITED STATES PATENTS

| | | | |
|---|---|---|---|
| 3,200,442 | 8/1965 | Haller | 425/354 X |
| 2,810,929 | 10/1957 | Willi | 425/443 X |
| 2,762,078 | 9/1956 | Haller | 425/78 |
| 2,825,092 | 3/1958 | Hatch | 425/78 |
| 3,020,589 | 2/1962 | Maritano | 425/78 |
| 3,452,395 | 7/1969 | Grieger | 425/78 |
| 3,664,784 | 5/1972 | Sibley | 425/78 |
| 1,839,056 | 12/1931 | Short | 425/414 X |
| 3,593,366 | 7/1971 | Smith | 425/416 X |
| 3,543,349 | 12/1970 | Marocco | 425/129 |

FOREIGN PATENTS OR APPLICATIONS 579,752  8/1946  Great Britain ................ 425/468

Primary Examiner—J. Spencer Overholser
Assistant Examiner—John S. Brown
Attorney—Irwin C. Alter et al.

[57] ABSTRACT

Apparatus for injection molding of hollow plastic articles having substantially uniform wall thickness throughout. Plastic is injected into a mold cavity around an article-defining core member. Associated with the core member is a movable sleeve member which controls the disposition of the plastic material around the core and retains the core centrally located within the cavity.

3 Claims, 5 Drawing Figures

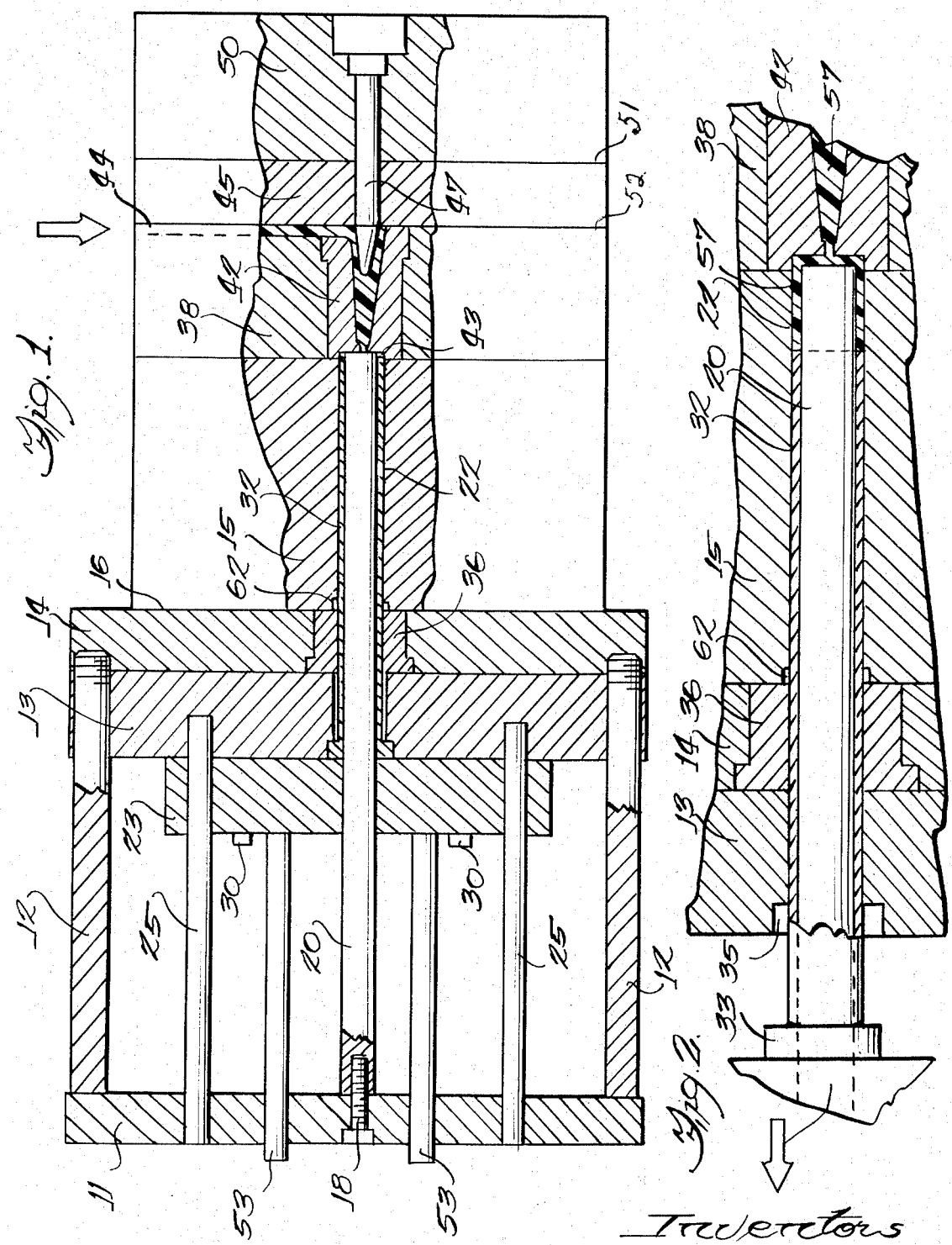

PATENTED DEC 11 1973
3,778,211
SHEET 2 OF 2
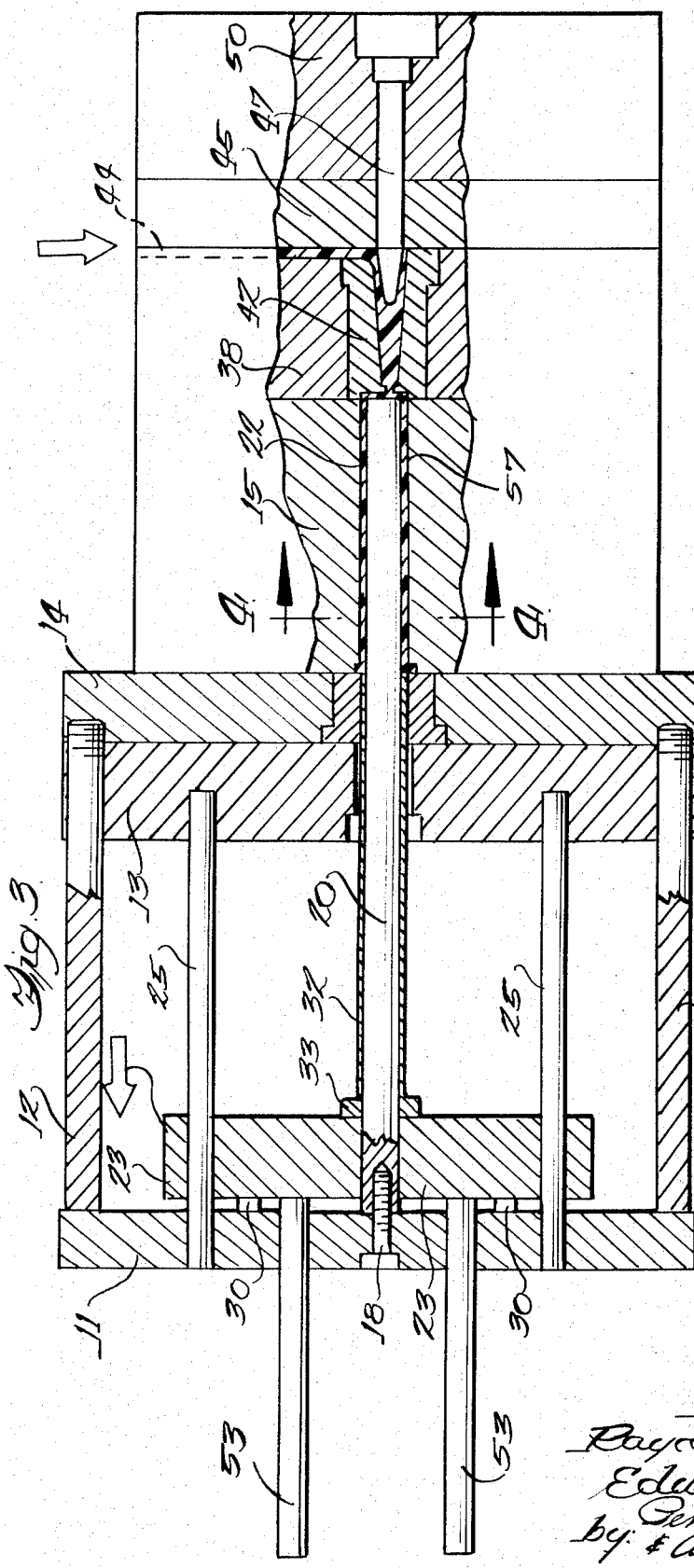

3,778,211

PLASTIC INJECTION MOLD APPARATUS

BACKGROUND OF THE INVENTION

This invention relates to plastic injection molding and more particularly to improvements in apparatus and processes for plastic injection molding of hollow plastic articles or tubes with a closed side.

Injection molding of hollow plastic articles is, of course, well known and particular constructions of molds useful for this operation are likewise known. Basically, such molds involve one or more core members, each of which is adapted to be received in a complementary cavity. A clearance is provided between the cavity and the core member to permit fluid plastic introduced into the cavity under pressure to flow around the core and to be formed into the desired shape by confinement between the core and cavity. Thereafter, the core is removed from the cavity and the mold is separated to permit ejection or removal of the formed plastic article.

An important consideration in the manufacture of these plastic articles, such as irosorb tubes or plastic vials used in certain medical and chemical testing procedures, is uniformity of the thickness of the walls of the vial. Where the walls are nonuniform, testing errors can result.

To insure uniformity of the walls of a plastic article during the moding process, it is necessary to hold the core in the center while the cavity is being filled. This is not a difficult procedure when a hollow tube open on both ends is being manufactured. The core may be held in position at each end. A different matter exists, however, when a vial is being produced because it has only one open end, the other end, corresponding to the bottom of the vial, being closed. Heretofore, in manufacturing vials of this nature, it was difficult to prevent the core position relative to the cavity wall from varying during the injection of plastic under pressure. Thus, nonuniformity of the wall thickness of vials would result, often rendering the vial unfit for its intended use.

It is therefore an important object of this invention to provide a plastic injection molding process and apparatus for forming a hollow plastic article with a closed end within the wall thickness is substantially uniform throughout. It is a further object to provide a molding system and apparatus where the mold core is retained in fixed relation to the mold cavity wall.

SUMMARY OF THE INVENTION

In one form, the invention comprises a mold having a mold cavity means for injecting plastic material into the mold cavity under pressure, a core member adapted for insertion therein, and means for inserting and retracting the core. A sleeve is provided for insertion into the cavity surrounding the core. The sleeve, which moves with respect to the core, is adapted to be inserted into the mold cavity prior to the introduction of the plastic material. When the plastic material is introduced into the mold, the sleeve is displaced. Since the position of the core remains fixed in the cavity as the sleeve is displaced, uniformity of the wall thickness of the molded plastic article is assured.

BRIEF DESCRIPTION OF THE DRAWINGS

FIG. 1 is a side elevational view of a mold embodying the features of this invention broken away and sectioned for illustration.

FIG. 2 is an enlarged partial side elevational view of the mold cavity and core member and associated elements.

FIG. 3 is a view similar to FIG. 1 with operating parts in different position than in FIG. 1.

FIG. 4 is a cross-section view taken on the line 41'4 of FIG. 3.

FIG. 5 is a perspective view of a plastic vial article formed by a mold having the construction shown in FIGS. 1 through 4.

DESCRIPTION OF THE PREFERRED EMBODIMENT

Inasmuch as the novel features of the present invention can be incorporated in injection molds of various designs, a preferred embodiment of this invention will be described in conjunction with the drawings which show, for ease of illustration, partial views of an injection mold embodying the present invention. It is to be understood that a complete apparatus for injection molding will include elements such as, for example, platens, water lines and the like which are not shown in the drawings or described hereinafter. These can be of various conventional types and their description is not deemed necessary for an understanding of this invention.

Referring to the drawings, and in particular FIG. 1, bottom clamp plate 11 is secured by parallel support blocks 12 to core support plate 13 and bushing retainer plate 14. These three members move as a single entity and can collectively be considered as forming a first major part of the mold assembly. As shown in FIG. 1 of the drawings, the mold is in a closed position with bushing retainer plate 14 abutting mold cavity retainer plate 15 at parting line 16. Rigidly secured to bottom clamp plate 11 by means of retainer screw 18 is a solid cylindrical core member 20 which is axially aligned with and adapted for insertion into mold cavity 22. A rectangularly shaped reciprocal ejector plate 23 moves with respect to the core member 20. This plate 23 is provided with suitable cutouts through which pass guide pins 25 while permitting reciprocating movement of the ejector plate. The guide pins 25 are provided to assist in guiding ejector plate 23 during reciprocal movement. The guide pins 25 are press fitted within bottom clamp plate 11 with their opposite ends being slip fitted within support plate 13. The ejector plate 23 is adapted for horizontal reciprocating movement as will be described hereinafter. A number of stop buttons 30 secured by welding to the ejector plate 23 serve to space it from bottom clamp plate 11 and limit the rearward travel of the ejector plate.

Referring both to FIG. 1 and FIG. 2, a freely slidable tubular sleeve member 32 is provided around the outer surface of core 20. This sleeve member is of a length to permit it to extend substantially completely into mold cavity 22 when the mold is fully closed, at which time the flange members 33 are received in complementary undercut notches 35 in support plate 13. Bushing 36 within retainer plate 14 serves to maintain the sleeve member 32 in alignment during reciprocal movement thereof.

Forming the second major operating part of the mold assembly is mold cavity retainer plate 15 which is rigidly secured to cavity sub-plate 38. FIG. 4 shows in cross-section the relationship of the mold cavity 22 to retainer plate 15 and the mold core 20 to cavity 22.

Disposed centrally within cavity sub-plate 38 at the terminus of mold cavity 22 is gate bushing 42, which in conjunction with runner 44 provides for introduction of plastic under pressure. The gate bushing 42 is preferably, but not necessarily, recessed, as at 43, to permit reception of the core 20 and sleeve 32.

Stripper plate 45 is provided with a central aperture through which projects bullet-shaped sucker pin 47. Sucker pin 47 is rigidly secured within top clamp plate 50 and is in registry with gate housing 42 so as to extend partially therewithin when the mold assembly is in closed position as shown in FIG. 1.

In operation, the mold parts are moved into closed position with bushing retainer plate 14 abutting cavity retainer plate 15 at parting line 16 and top clamp plate 50 abutting stripper plate 45 at parting line 51 with stripper plate 45 in turn abutting cavity sub-plate 38 at parting line 52. These mold parts can be moved into closed position by hydraulic pressure. When in this position, as shown in FIG. 1, core 20 is fully inserted into mold cavity 22. Prior to introduction of the plastic to be molded, ejector plate 23 is caused to move to a fully inward position by means of knockout pins 53 which pass through suitable openings in bottom clamp plate 11. These knockout pins are driven as is conventional by a suitable press (not shown). When ejector plate 23 is in the fully inward position (FIG. 1), the slidable sleeve member 32 is inserted fully into mold cavity 22.

With the mold parts positioned as in FIG. 1, introduction of a plastic material to be molded is then commenced with the plastic material being introduced under pressure through a conventional sprue bushing (not shown) through runner 44 and into gate bushing 42. The plastic influenced by sucker pin 47 impinges upon the end of the core and flows around the core in the mold cavity. As the plastic material indicated by numeral 57 flows around the core, it forces the slidable sleeve member 32 out of the mold cavity 22. The sleeve member acts as a barrier as the plastic material spreads around and envelopes the core member. In this way, it serves to prevent uneven flow of the plastic material around the core, thus assuring formation of a plastic article having substantially uniform wall thickness. This uniformity of the plastic article is also achieved because the core 20 is maintained in alignment in the cavity 22 by the sleeve 32. FIG. 2 shows the sleeve member 32 partially out of the mold cavity 22 due to the plastic material acting thereon.

As the sleeve member 32 is forced out of the mold cavity 22, it acts on ejector plate 23 forcing it to the rear or to the position shown in FIG. 3. The rearward movement of ejector plate 23 ceases when stop buttons 30 meet or abut bottom clamp plate 11 and at this time injection of plastic ceases. The mold is cooled to facilitate and speed solidification of the plastic material. The mold parts are then moved into an open position with bushing retainer plate 14 separating from mold cavity plate 15 and core 20 simultaneously being withdrawn completely from the mold cavity 22. The formed plastic material adheres to the core 20 and is withdrawn therewith from the mold cavity. When the core is sufficiently retracted so that the formed plastic article is clear of the mold cavity, ejector plate 23 is again caused by knockout pins 53 to move inwardly of the mold thereby forcing sleeve member 32 inwardly to knock the formed plastic article from the core with the formed article dropping out of the mold through the space provided by the separation of bushing retainer plate 14 and mold cavity plate 15.

During the time that the core is being retracted from the mold cavity and the formed article removed therefrom, top clamp plate 50 can be retracted and parted from stripper plate 45 at parting line 51. Also, simultaneously the stripper plate 45 is caused to part at parting line 52 from cavity subplate 38. In this manner the stripper plate removes excess plastic from sucker pin 47. Another molding operation can then be conducted by repeating the above cycles.

It will be understood that the size and configuration of the mold cavity can be varied depending upon the size and configuration desired for the molded plastic article. For purposes of illustration herein, there is described a mold adapted for producing a cylindrical plastic vial 60 having an annular lip 61 thereon, as shown in FIG. 5. The lip is formed on the vial by virtue of the annular recess 62 provided in the mold cavity 22. It will be appreciated that the wall thickness of the molded plastic articles can vary and will depend upon the clearance between the outer surface of the core and the inner surface of the mold cavity.

Those modifications and equivalents which fall within the spirit of the invention are to be considered a part thereof.

What is claimed is:

1. Injection molding apparatus for molding formed plastic articles,
   said molding apparatus including a mold,
   said mold having a cylindrical cavity,
   a removable core member adapted for insertion into said cavity,
   core support means affixed to one end of said core member,
   said core support means having an inserted position and a retracted position whereby when said core support means is in said inserted position said core member is inserted into said cavity and when said core support means is in said retracted position said core member is retracted from said cavity,
   means for introducing plastic material under pressure into said cavity,
   a sleeve member contiguously surrounding said core member and rotatably movable relative thereto,
   ejector plate means affixed to one end of said sleeve member,
   said ejector plate means associated with said core support means so that when said core support means moves between the inserted position and the retracted position said ejector plate means also moves,
   said ejector plate means being movable relative to said core support means between a sleeve inserted position and a sleeve retracted position whereby when said ejector plate means is in said sleeve inserted position, said sleeve extends beyond said core support means and is inserted into said cavity,
   knock out pin means for placing said ejector plate means into said sleeve inserted position prior to introduction of the plastic material into said cavity for enabling the movement of said ejector plate means to the retracted position responsive to the force of the plastic material on the sleeve member.

2. The molding apparatus of claim 1 wherein means are provided for moving said core support means away from said mold, and means for forcing said ejector plate to the inserted position with said core support means removed from said mold to thereby cause said sleeve member to remove the formed plastic article from said core member.

3. A mold for plastic injection molding comprising a mold cavity; a core member for insertion into said cavity; means for inserting and retracting said core member; means for introducing plastic material to be molded into said cavity; and a sleeve member surrounding said core member and movable relative thereto, said sleeve member being adapted for insertion into said mold cavity prior to introduction of the plastic material when it is introduced into the mold cavity; a clamp plate, said core being permanently mounted on said clamp plate; and an ejector plate provided for movement with respect to said clamp plate and core, said sleeve member being movable with respect to said ejector plate.

* * * * *